United States Patent [19]

Yukimoto et al.

[11] Patent Number: 4,630,179
[45] Date of Patent: Dec. 16, 1986

[54] RETRACTABLE LAMP STRUCTURE

[75] Inventors: Kazuyoshi Yukimoto, Kariya; Kenichi Fukura, Toyota; Eiji Hiramatsu, Nukata; Akira Nishimura, Toyota, all of Japan

[73] Assignees: Aisin Seiki Kabushiki Kaisha, Kariya; Toyota Jidosha Kabushiki Kaisha, Toyota, both of Japan

[21] Appl. No.: 704,777

[22] Filed: Feb. 25, 1985

[30] Foreign Application Priority Data

Mar. 29, 1984 [JP] Japan .................................. 59-62043

[51] Int. Cl.⁴ ............................................. B60Q 1/06
[52] U.S. Cl. ...................................... 362/66; 362/269
[58] Field of Search ..................... 362/61, 65, 66, 70, 362/80, 68, 269, 274, 63, 285, 287

[56] References Cited

U.S. PATENT DOCUMENTS 3,742,205  6/1973  Beauregard et al. ................. 362/65
4,471,410  9/1984  Nakano ................................ 362/65
4,516,191  5/1985  Moriyama et al. .................. 362/66

Primary Examiner—Craig R. Feinberg
Assistant Examiner—David A. Okonsky
Attorney, Agent, or Firm—Oblon, Fisher, Spivak, McClelland, & Maier

[57] ABSTRACT

A retractable lamp which includes a lamp pivotally held at a first axis to be extended out of and retracted into a housing, a lampcover pivotally held at a second axis to open and close an opening of the housing for exposing and retracting the lamp, and a swing member for imparting motions to the lamp and the lampcover. The retractable lamp can reduce the open area between the lampcover and the lamp which are exposed out of the housing. Due to the reduction of the open area, a reduction in air resistance and noise is thus created and an improvement in the fuel efficiency of an automobile can be realized.

7 Claims, 6 Drawing Figures

RETRACTABLE LAMP STRUCTURE

BACKGROUND OF THE INVENTION

1. Field of the Invention

This invention relates to a retractable lamp which can be extended out of and retracted into a housing therefor. The retractable lamp may be employed as a vehicle headlight, and more particularly as an automobile headlight. Further, it may also be employed in other types of lighting fixtures.

2. Description of the Prior Art

In the lighting field, particularly the automotive lighting field, retractable lamps have been developed to be employed as headlights. As a conventional retractable lamp employed as an automobile headlight the lamp and the lampcover thereof are secured together and pivotally held at a housing thereof for the retractable lamp to extended out of and be retracted into the housing as needed for lighting.

The lamp extended out of the housing and the lampcover opened to expose the lamp are subjected to air resistance when the automobile installed with the retractable lamp is being driven.

In order to reduce the air resistance against the lamp exposed and the lampcover opened, the lampcover should be opened in a minimal fashion while the lamp is extended out of the housing for lighting as required.

However, the reduction of the air resistance as mentioned above brings about a problem as to lighting in a conventional retractable lamp structure. The exposure of the lamp will be reduced with the reduction in the pivotal opening movement of the lampcover as the lamp and the lampcover are pivotally secured together at the same axis in a conventional retractable lamp structure.

SUMMARY OF THE INVENTION

It is an object of the present invention, therefore, to provide an improved retractable lamp in which the pivotal opening movement of the lampcover is reduced while the lamp is exposed out of the housing as required for lighting.

The retractable lamp of this invention comprises a lamp pivotally held at a first axis to be extended out of and retracted into a housing, a lampcover pivotally held at a second axis to open and close an opening of the housing for exposing and retracting the lamp, and swing means for imparting motions to the lamp and the lampcover. The lamp and the lampcover are capable of moving simultaneously by means provided on the lamp and the lampcover for pulling the lampcover by the lamp being pivotally moved downward and means provided on the lamp and the lampcover for pushing the lampcover by the lamp being pivotally moved upward.

The housing of this invention may employ a housing utilized in a conventional retractable lamp in holding a lamp and a lampcover. A portion of an automobile body such as a fender or a bracket secured to the automobile body may be used for the housing when this invention is employed for an automobile retractable headlight.

The lamp of the present invention is pivotally held at a first axis to be extended out of and retracted into the housing as necessary for lighting. The lamp is pivotally held at the back thereof, i.e. the side of the lamp opposite to the lighting direction, to the housing by means of a hinge. When this invention is employed in an automobile headlight, the lamp may comprise a lamp body and a bracket attached thereto so that the lamp may be pivotally held by the housing by a part of the bracket.

In addition, a conventional lamp may be utilized for the lamp of this invention.

The lampcover of this invention is pivotally held by the housing along a second axis to open and close an opening of the housing for extending out and retracting the lamp. The lampcover is opened to expose the lamp out of the housing when lighting is needed at night. The same is closed to retract the lamp into the housing when the lighting is not desired during daytime. Generally the lampcover is pivotally held by the housing at a portion thereof opposite the lighting direction by means of a hinge.

It is a characteristic of this invention that the lamp and the lampcover are held at the respective pivotal axes as set forth above.

The lamp and the lampcover of this invention move pivotally on the respective axes as opposed to the lamp and the lampcover of a conventional retractable lamp which move concentrically.

The lamp and the lampcover of this invention move in a manner such that the lamp and the lampcover come closer to each other when the lamp is extended out of the housing for lighting. The distance traveled during pivotal movement of the lampcover can thus be reduced while the exposure of the lamp is maintained as required for the lighting. Likewise the air resistance of the lampcover can be reduced when the present invention is employed in an automobile headlight.

As a special application of this invention, the lamp and the lampcover may be moved in a manner such that the lamp and the lampcover come closer to each other when the lamp is being retracted into the housing so that the housing can be made smaller.

Swinging means for imparting motion to the lamp and the lampcover of this invention is employed in pivotally moving the lamp and the lampcover. The swing means for imparting motion to the lamp and the lampcover comprises a motor and a crank moved thereby.

The lamp and the lampcover are connected with each other by means of a tension spring so that the lampcover can be pulled together with the lamp when the lamp is being retracted into the housing by means of the motor rotating the crank connected with the lamp.

Generally, a single swing means for imparting motions to the lamp and the lampcover is employed in pivotally moving the lamp and the lampcover. However, an additional swing means for imparting motions to the lamp and the lampcover may be employed depending upon the requirements therefor.

The retractable lamp of this invention can pivotally move the lamp and the lampcover on the respective i.e., the first axis for the lamp and the second axis for the lampcover, by the swing means for imparting motions to the same, thereby positioning the lampcover closer to the lamp when the lamp is extended out of the housing for the lighting.

An advantage of this invention is that the retractable lamp employed in an automobile headlight can reduce the distance required for opening movement of the lampcover, thereby reducing the air resistance and improving the fuel efficiency of the automobile.

Another advantage of this invention is that the housing space necessary for the lamp to be retracted thereinto can be reduced due to the pivotal movements of the lamp and the lampcover on the respective axises.

BRIEF DESCRIPTION OF THE DRAWINGS

Further objects, features and advantages of this invention will be readily appreciated as the same becomes better understood by reference to the following detailed description when considered in connection with the accompanying drawings, in which like reference numbers designate the same or similar parts throughout the figures thereof and wherein:

FIG. 1 is a side view of the retractable lamp of this invention showing the lamp extended out of the housing with the lampcover therefor open.

FIG. 2 is a side view, like FIG. 1, of the retractable lamp of this invention showing the lamp retracted in the housing therefor with the lampcover closed;

FIG. 3 is an exploded perspective view of the housing portion of the retractable lamp of this invention;

FIG. 4 is a sectional view of the first and second pivotal axes in the housing portion of the retractable lamp of this invention;

FIG. 5 is a sectional view of the stopper for the lampcover and the adjacent portion thereof and;

FIG. 6 is a perspective view of the headlight portion of an automobile for which the retractable lamp of this invention is employed.

DESCRIPTION OF THE PREFERRED EMBODIMENT

Figure 1:
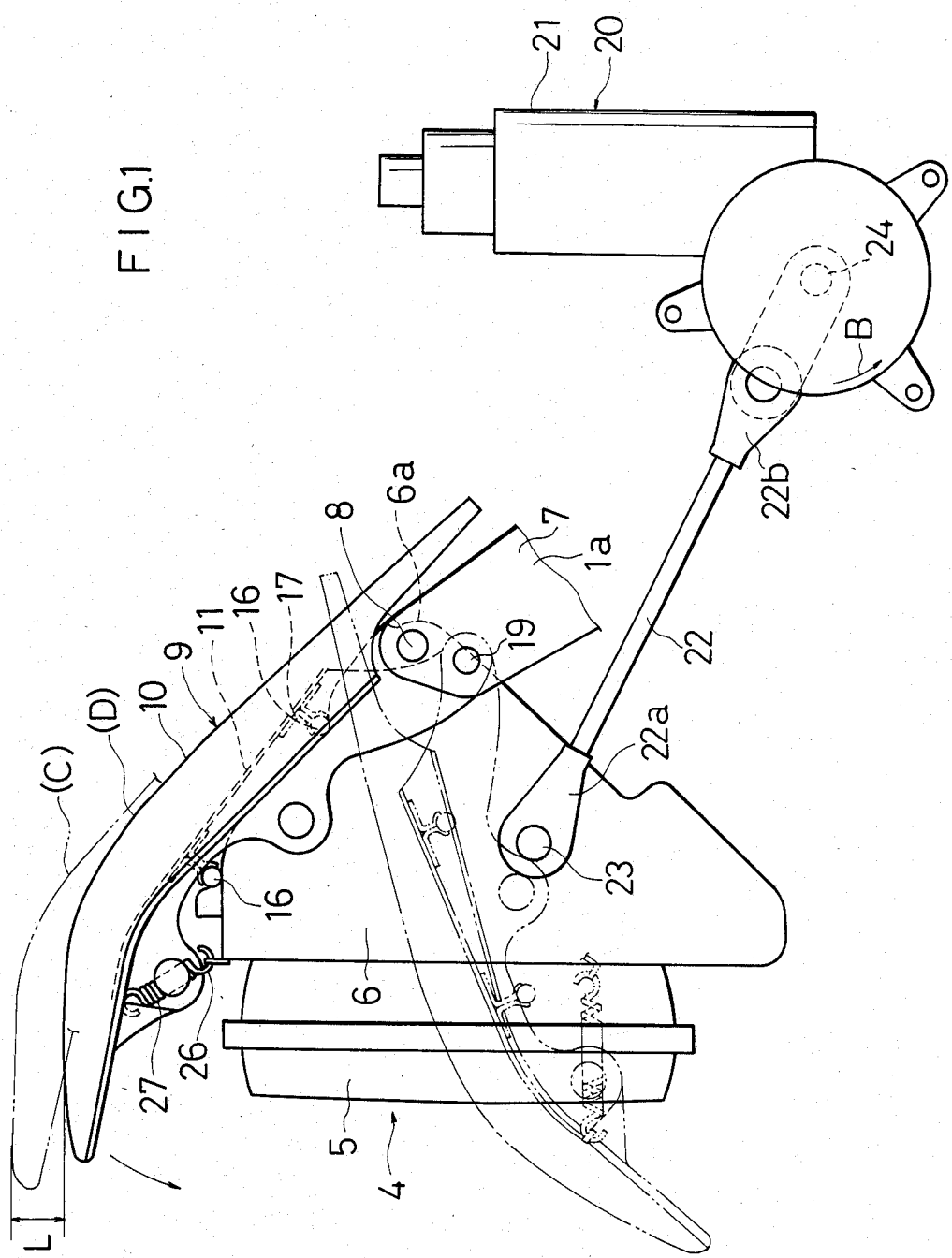
FIGS. 1-6 show an embodiment of the retractable lamp of this invention employed for an automobile headlight.

Referring now to the drawings, wherein like reference numbers designate identical or corresponding parts throughout the several views, and more particularly to FIG. 1, a lamp 4 of this invention is extended out of a housing 1 when a lampcover 9 is open, the lamp 4 being illustrated as having a lamp body 5 attached to a bracket 6 pivotally movable by means of a motor 21 via a crank shaft 22.

Figure 2:
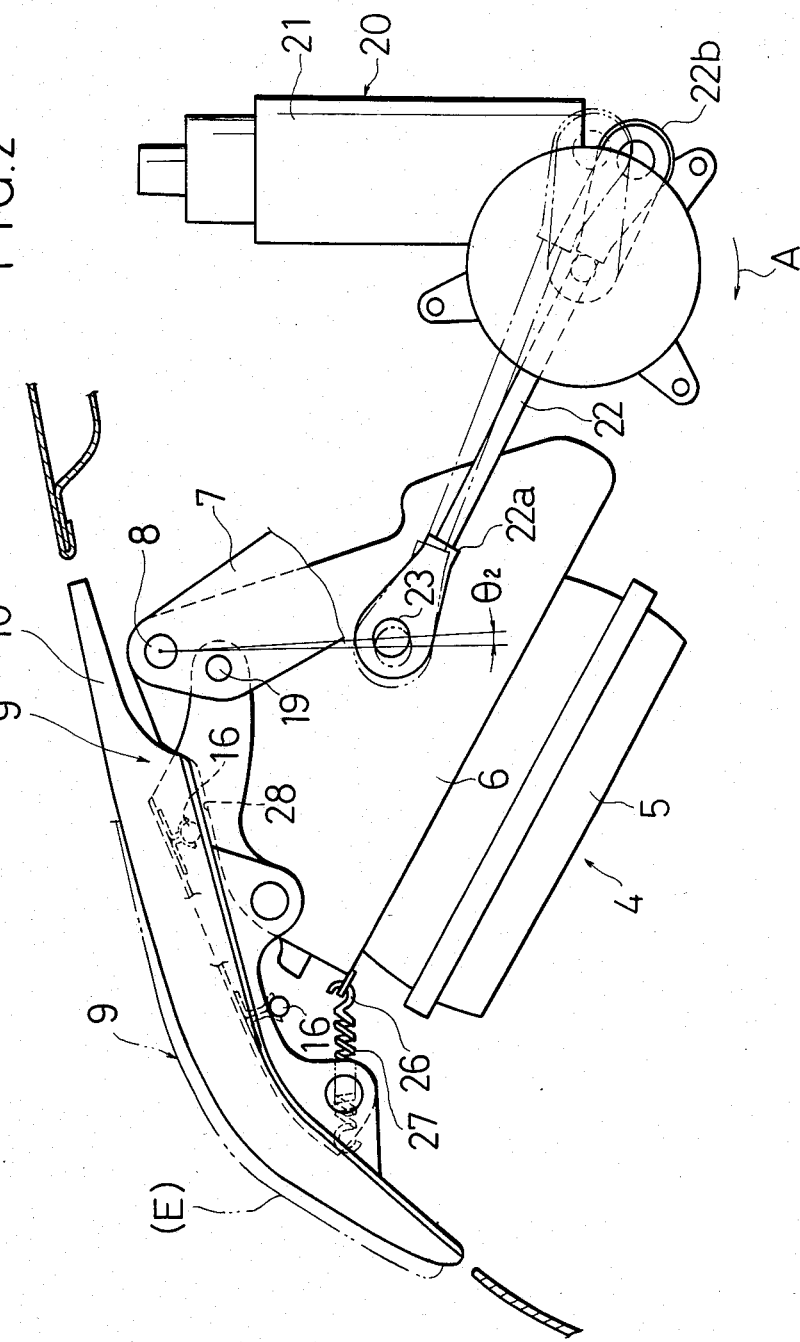

FIG. 2 illustrates the lamp 4 retracted into the housing 1 with the lampcover 9 closed.

Figure 3:
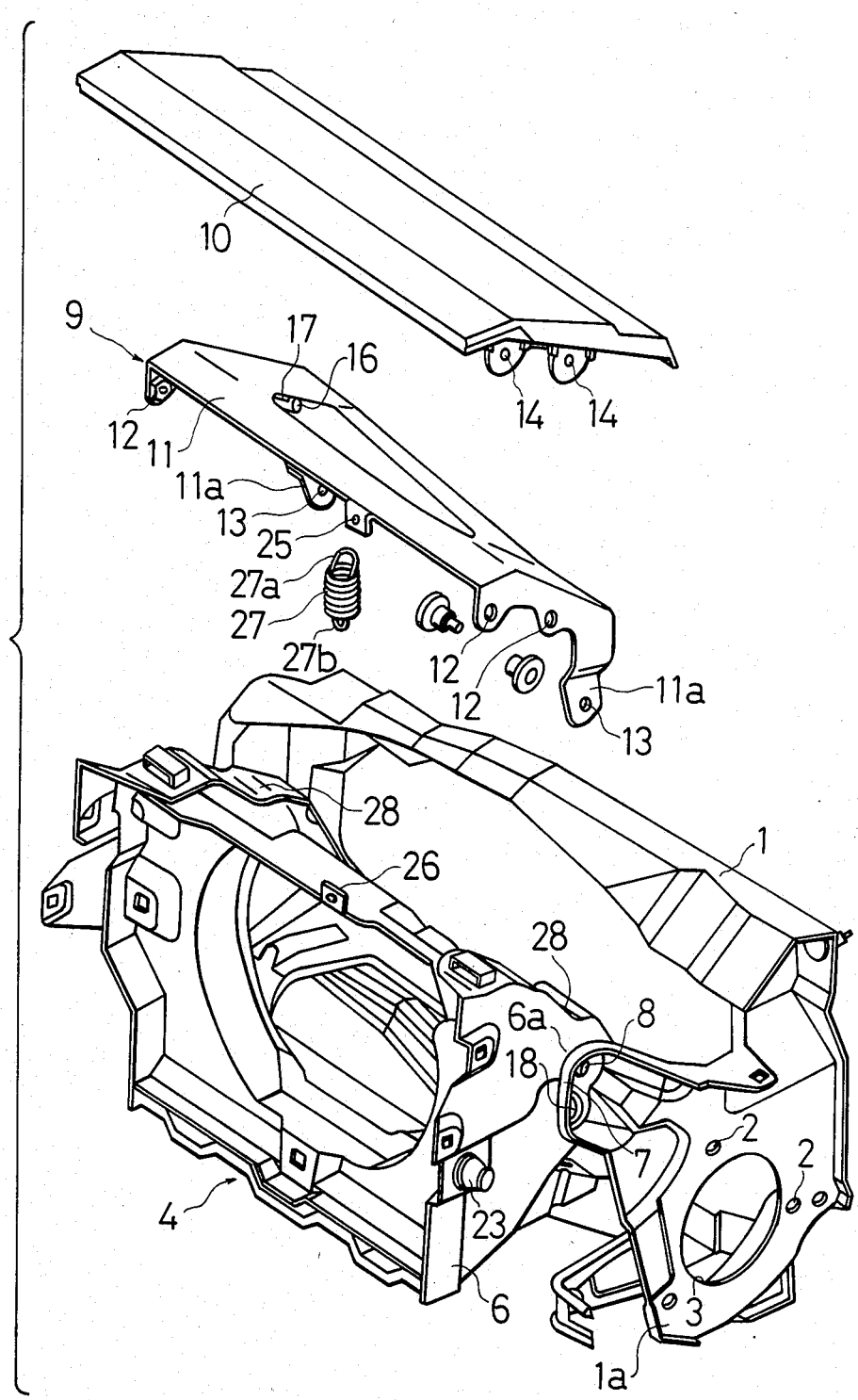
Figure 4:
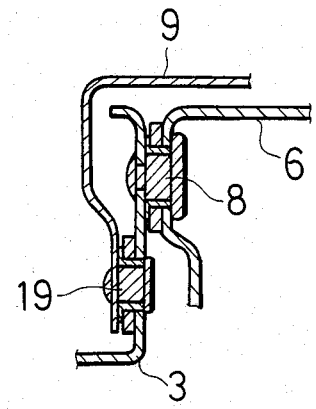

As illustrated in FIG. 3, the housing 1 of this invention is a fixed bracket, made of steel sheet, installed on the automobile body. The housing 1, also illustrated in FIG. 3, is provided with a plate member 1a, wherein the motor 21 is to be mounted. Round holes 2 and a large-diameter hole 3 for mounting the motor 21 and an extended portion or support 7 for holding the bracket 6 of the lamp 4 are formed on the plate member 1a. The lamp body 5 is detached in FIG. 3 for the purpose to clearly show the housing 1.

The bracket 6 is pivotally secured to the extended portion 7 of a plate member 1a by means of a hinge 8 (i.e., the first pivotal axis), thereby enabling the lamp 4 to move upwardly and downwardly in relation to the housing 1.

Cam surfaces 28 are provided on the top side of the bracket 6 to contact with pins 16 provided on the bottom surface of an inner cover 11.

The lampcover 9 as illustrated in FIG. 3 comprises an outer cover 10 and the inner cover 11 includes arm portions 11a. A round hole 13 is formed in each arm portion 11a. Weld nuts 12 are connected to the side portions of the inner cover 11. Round holes 14 are provided in the outer cover 10 for installation thereof.

The outer cover 10 and the inner cover 11 are secured together by means of fasteners inserted through the round holes 14 and the weld nuts 12.

A pair of pins 16 which contact with the cam surfaces 28 are secured on the inner cover 11 by means of brackets 17 as illustrated in FIGS 1 and 3.

The round holes 13 of the inner cover 11 and holes 18 are provided at the extended portions 7 of the plate member 1a are fastened together by means of hinges 19, shown in FIG. 1, thereby enabling the lampcover 9 to move upwardly and downwardly in relation to the housing 1.

As illustrated in FIGS. 1 and 2, the hinges 8 functioning as the first pivotal axis and the hinges 19 functioning as the second pivotal axis are spaced apart, and especially in this embodiment the hinges 19 are positioned below as well as forward in relation to the hinges 8.

A helical tension spring 27 is provided in this embodiment, a first spring end 27a of which is hooked to a hole 25 formed on the inner cover 11 and a second spring end 27b is hooked to a hole 26 provided on the topside of the bracket 6, thereby enabling the lampcover 9 to move upwardly and downwardly together with the lamp 4 according to the movement thereof.

As illustrated in FIG. 1, a swing means 20 for moving the lamp 4 and the lampcover 9 upwardly and downwardly comprises a motor 21 and a crank shaft 22 pivotally movable by means of the rotation provided by the motor 21. The crank shaft 22 is connected with the bracket 6 at a crank end 22a by means of a pin 23. The other crank end 22b rotates around the axis 24 by means of the rotation provided by the motor 21.

When lighting is desired at night, the motor 21 rotates the crank shaft end 22b in the direction as indicated by an arrow A in FIG. 2, whereby the crank shaft 22 pushes the bracket 6 to move the lamp 4 upwardly with the hinge 8 being the pivotal axis therefor. Further, the cam surface 28 provided on the top side of the bracket 6 contacts with the pin 16 provided at the bottom side of the lamp cover 9 by the above operation, whereby the bracket 6 moving upwardly pushes the lampcover 9 to move accordingly with the hinges 19 being the pivotal axis therefor.

The retractable lamp of this invention can reduce the open area between the lampcover 9 and the lamp 5 by the distance L in comparison with a conventional retractable lamp as illustrated in FIG. 1. In a conventional retractable lamp structure, the lamp 5 and the lampcover 9 are pivotally secured at the same axis, the portion comparable to the hinge 8 at which the lamp 4 being pivotally secured in the present invention. The lampcover 9 of the present invention will open to the position (D) as indicated by a full line in FIG. 1 due to the pivotal axis thereof at the hinges 19 positioned below as well as forward in relation to the hinges 8 as opposed to the conventional lampcover secured as set forth above which opens to the position (C) as indicated by an imaginary line in FIG. 1. Hence the retractable lamp of this invention realizes a reduction in the air resistance and the noise created thereby and an improvement in the fuel efficiency of the automobile to which it is mounted.

When lighting is not desired as during daytime, the motor 21 is started rotates the crank shaft end 22b in the direction as indicated by an arrow B in FIG. 1, whereby the crank shaft 22 pulls the bracket 6 to move the lamp 4 downwardly so as to be retracted in the housing 1 with the hinges 8 being the pivotal axis therefor. As illustrated in FIG. 2, the lampcover 9 will move downwardly with the hinges 19 being the pivotal axis therefor, together with the bracket 6 being pivotally pulled downward by the crank shaft 22 as set forth above, due to the spring 27 connecting the lampcover 9 at the hole 25, as shown in FIG. 3, and the bracket 6 at the hole 26, whereby the lampcover 9 closes the opening of the housing 1.

When closing the lampcover 9 in the manner described above, the crank shaft 22 may stop at the position indicated by chain double-dashed lines in FIG. 2 without moving to the position indicated by full lines, due to a deviation in the position of the crank shaft end 22b caused, for example, by irregular rotation of the motor 21, thereby causing the bracket 6 to stop at the position deviated by an angle $\theta_2$ from the position intended for the retracting thereof.

Figure 5:
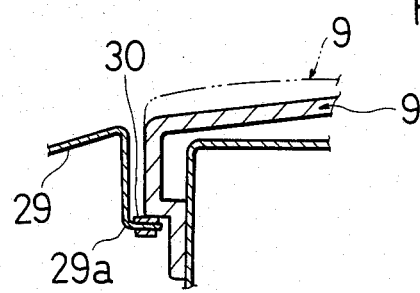
Figure 6:
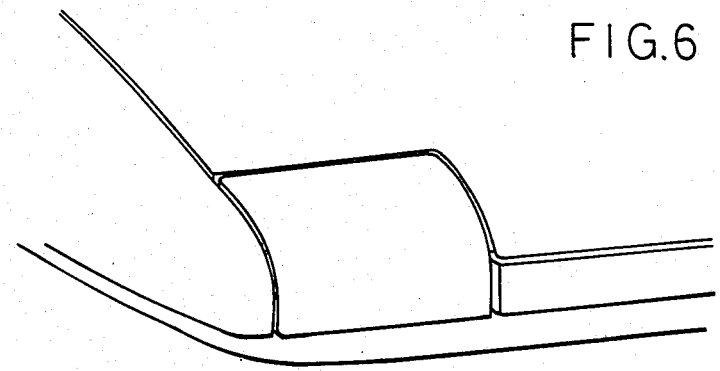

If such a case occurs with a conventional retractable lamp structure as aforementioned wherein the lampcover and lamp are pivotally secured along the same axis, the lampcover will be pushed up to the position (E) as indicated in chain double-dashed lines in FIG. 2 by the lamp 4, thereby resulting in the formation of an uneven surface with a fender 29 as illustrated in FIG. 5.

In order to solve this problem the retractable lamp of this invention is provided with a stopper 30 made of rubber at an end portion 29a of the fender 29 with which the lampcover 9 contacts. The downward movement of the lampcover 9 ceases as the lampcover 9 contacts with the stopper 30 before the lamp 4 is completely retracted. Hence the lampcover 9 will be held securely to form an even surface with the fender 29 by the spring 27 connecting the lampcover 9 with the lamp 4.

In addition to solving the above problem, the retractable lamp of this invention can improve the style of an automobile and reduce the air resistance.

Obviously, many modifications and variations of the present invention are possible in the light of the above teachings. It is therefore to be understood that within the scope of the appended claims, the invention may be practiced otherwise than as specifically described.

What is claimed is:

1. A retractable lamp, comprising:
   a housing having an opening formed therein and a support;
   a lamp pivotally held by a first single hinge defining a first axis to be extended out of and retracted into said housing, said first axis being at a fixed location on said support;
   a lampcover pivotally held by a second single hinge defining a second axis to open and close said opening of said housing for exposing and retracting said lamp, said second axis being at a fixed location on said support, said second hinge being located below said first hinge; and
   swing means connected to said housing for moving said lamp and said lampcover, whereby said lamp and said lampcover move simultaneously on the respective axes.

2. The retractable lamp according to claim 1, wherein said lamp further comprises a vehicle headlamp.

3. The retractable lamp according to claim 1, further comprising connecting means provided on said lamp and said lampcover for pulling and pushing said lampcover upon said lamp being pivotally moved downward and upward.

4. The retractable lamp according to claim 1, further comprising a pair of pins projecting downwardly from said lampcover, said lamp being guided by said pins during mutual movement of said lamp and said lampcover, wherein said lamp is closely connected with said pins when said lamp is completely open.

5. The retractable lamp according to claim 1, wherein said swing means for imparting motions to said lamp and said lampcover further comprises a motor mounted on a part of said housing for pivotally moving said lamp and said lampcover, and a crank for pivotally moving said lamp and said lampcover by means of rotary motion provided by said motor, and wherein said lampcover is pivotally movable simultaneously with said lamp.

6. The retractable lamp according to claim 5, further comprising a tension spring connecting said lamp with said lampcover for pulling said lampcover upon said lamp being pivotally moved downward and means provided on said lamp and lampcover for pushing said lampcover upon said lamp being pivotally moved upward.

7. The retractable lamp according to claim 6, further comprising a stopper for stopping said lampcover when said lampcover is being pivotally moved to close said opening of said housing.

* * * * *